(12) United States Patent
Das

(10) Patent No.: US 10,554,956 B2
(45) Date of Patent: Feb. 4, 2020

(54) DEPTH MASKS FOR IMAGE SEGMENTATION FOR DEPTH-BASED COMPUTATIONAL PHOTOGRAPHY

(71) Applicant: Dell Products, LP, Round Rock, TX (US)

(72) Inventor: Sujata Das, Saratoga, CA (US)

(73) Assignee: Dell Products, LP, Round Rock, TX (US)

( * ) Notice: Subject to any disclaimer, the term of this patent is extended or adjusted under 35 U.S.C. 154(b) by 453 days.

(21) Appl. No.: 14/927,272

(22) Filed: Oct. 29, 2015

(65) Prior Publication Data

US 2017/0127046 A1 May 4, 2017

(51) Int. Cl.

| | | |
|---|---|---|
| *H04N 13/271* | (2018.01) | |
| *G06T 5/00* | (2006.01) | |
| *H04N 13/161* | (2018.01) | |
| *H04N 13/204* | (2018.01) | |

(52) U.S. Cl.
CPC .......... *H04N 13/271* (2018.05); *G06T 5/002* (2013.01); *H04N 13/161* (2018.05); *H04N 13/204* (2018.05)

(58) Field of Classification Search
None
See application file for complete search history.

(56) References Cited

U.S. PATENT DOCUMENTS

| | | | |
|---|---|---|---|
| 5,065,236 A | 11/1991 | Diner | |
| 5,135,308 A | 8/1992 | Kuchel | |
| 6,441,817 B1 | 8/2002 | Gossweiler, III et al. | |
| 7,535,002 B2 | 5/2009 | Johnson et al. | |
| 7,994,480 B2 | 8/2011 | Johnson et al. | |
| 8,007,110 B2 | 8/2011 | Dunn et al. | |
| 8,098,276 B2 | 1/2012 | Chang et al. | |
| 8,265,425 B2 | 9/2012 | Ng-Thow-Hing et al. | |
| 8,280,107 B2 | 10/2012 | Kmiecik et al. | |
| 8,290,358 B1 | 10/2012 | Georgiev | |
| 8,300,089 B2 * | 10/2012 | Robinson | G06T 15/20 348/47 |

(Continued)

OTHER PUBLICATIONS

Branch et al, "A Hole-Filling Algorithm for Triangular Meshses Using Local Radial Basis Function", Conference Paper, Jan. 2006 (Year: 2006).*

*Primary Examiner* — Chikaodili E Anyikire
(74) *Attorney, Agent, or Firm* — Prol Intellectual Property Law, PLLC; H. Kenneth Prol

(57) ABSTRACT

A depth-based computational photography method includes recording a first image using a stereoscopic camera system, establishing a disparity map, via a processor, of the first image including a determination of pixel distance between features in the first image and the features in a second image, determining a histogram of pixel disparity values from the disparity map, and removing statistical outlier pixel disparity values. The method further includes identifying holes in disparity map of the first image and computationally shrinking holes in the disparity map via averaging disparity map values based on radially sampled areas proximate to the hole and sharpening histogram pixel disparity value peaks by shifting pixel disparity values in a close neighborhood range of a histogram pixel disparity value peak maximum closer to a pixel disparity value at the histogram pixel disparity value peak maximum.

20 Claims, 6 Drawing Sheets

(56) References Cited

U.S. PATENT DOCUMENTS

| | | |
|---|---|---|
| 8,446,470 B2 | 5/2013 | Lu et al. |
| 8,514,225 B2 | 8/2013 | Genova |
| 8,619,082 B1 | 12/2013 | Ciuera et al. |
| 8,854,431 B2 | 10/2014 | Song et al. |
| 8,866,889 B2 | 10/2014 | Masalkar et al. |
| 8,947,534 B2 | 2/2015 | Dunn et al. |
| 9,736,455 B2* | 8/2017 | Georgiev ............. H04N 13/161 |
| 9,741,125 B2* | 8/2017 | Baruch ................. G06T 7/187 |
| 2002/0031253 A1 | 3/2002 | Dialameh et al. |
| 2007/0296721 A1* | 12/2007 | Chang ................... G06T 15/10 345/427 |
| 2010/0208994 A1* | 8/2010 | Yao ....................... G06T 5/005 382/173 |
| 2010/0235129 A1 | 9/2010 | Sharma et al. |
| 2011/0176108 A1 | 7/2011 | Nakagawa et al. |
| 2012/0056982 A1 | 3/2012 | Katz et al. |
| 2012/0070070 A1* | 3/2012 | Litvak ................ G06K 9/00201 382/154 |
| 2012/0087573 A1* | 4/2012 | Sharma ............. G06K 9/00771 382/154 |
| 2012/0218391 A1 | 8/2012 | Baker |
| 2012/0249746 A1* | 10/2012 | Cornog ................. H04N 13/128 348/47 |
| 2012/0257018 A1 | 10/2012 | Shigemura et al. |
| 2013/0002816 A1* | 1/2013 | Hannuksela ............. G06T 9/00 348/43 |
| 2013/0050437 A1 | 2/2013 | Robinson |
| 2013/0127844 A1* | 5/2013 | Koeppel ............... G06T 15/205 345/419 |
| 2013/0147911 A1* | 6/2013 | Karsch ................. H04N 13/261 348/43 |
| 2013/0182083 A1 | 7/2013 | Grossmann |
| 2013/0208093 A1* | 8/2013 | Sun ........................ G06T 5/003 348/46 |
| 2013/0250053 A1 | 9/2013 | Levy |
| 2014/0055560 A1* | 2/2014 | Fu ........................... G06T 5/005 348/42 |
| 2014/0063188 A1* | 3/2014 | Smirnov ................ G06T 7/593 348/43 |
| 2014/0085435 A1* | 3/2014 | Doyen ................. H04N 13/111 348/51 |
| 2014/0094307 A1 | 4/2014 | Doolittle et al. |
| 2014/0111623 A1 | 4/2014 | Zhao et al. |
| 2014/0111627 A1* | 4/2014 | Ishigami ............. H04N 13/302 348/51 |
| 2014/0240469 A1 | 8/2014 | Lee |
| 2014/0267611 A1* | 9/2014 | Kennett ............. G06K 9/00335 348/46 |
| 2014/0307058 A1 | 10/2014 | Kirk et al. |
| 2015/0116312 A1* | 4/2015 | Baik ................. H04N 13/0011 345/419 |
| 2015/0245007 A1* | 8/2015 | Hyodo ................. H04N 13/128 382/154 |
| 2015/0334365 A1* | 11/2015 | Tsubaki ................ G06T 15/20 348/51 |
| 2016/0188995 A1* | 6/2016 | Somanath .......... G06K 9/00214 382/203 |
| 2017/0127046 A1* | 5/2017 | Das ........................ G06T 5/002 |

* cited by examiner

DEPTH MASKS FOR IMAGE SEGMENTATION FOR DEPTH-BASED COMPUTATIONAL PHOTOGRAPHY

FIELD OF THE DISCLOSURE

The present disclosure generally relates to information handling systems, and more particularly relates to image processing.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. Information handling systems may include one or more digital camera systems for capturing images. Digital camera systems may be used to acquire plural images that are combined to form composite images from one or more digital camera image sensors.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Depth determinations of objects and depth mask application in images acquired utilizing digital cameras may yield errors due to incompleteness or noise in the determination of disparity maps for construction of a composite plural image processed for depth determinations. Accordingly, encoding depth masks capable of highlighting objects within a composite plural image or for highlighting gaps or distances between objects appearing in a plural image scene may similarly produce artifacts. In such a circumstance, additional post-processing may be done to improve the depth mask and provide improved depth-based image segmentation. The present disclosure describes several embodiments for constructing composite plural images from a stereoscopic digital camera system with improved disparity map determination and depth mask generation.

Depth masks may be used to provide for image segmentation of the composite plural image for the purpose of accurate distance determination through depth or z-value distances within the image. In particular example embodiments, improved depth mask generation may provide for intelligent image segmentation to correlate with location of objects within composite plural image scenes. Additionally, depth masks for depth-based image segmentation permits intelligent application of depth-based filters to be applied to the composite plural image.

Figure 1:
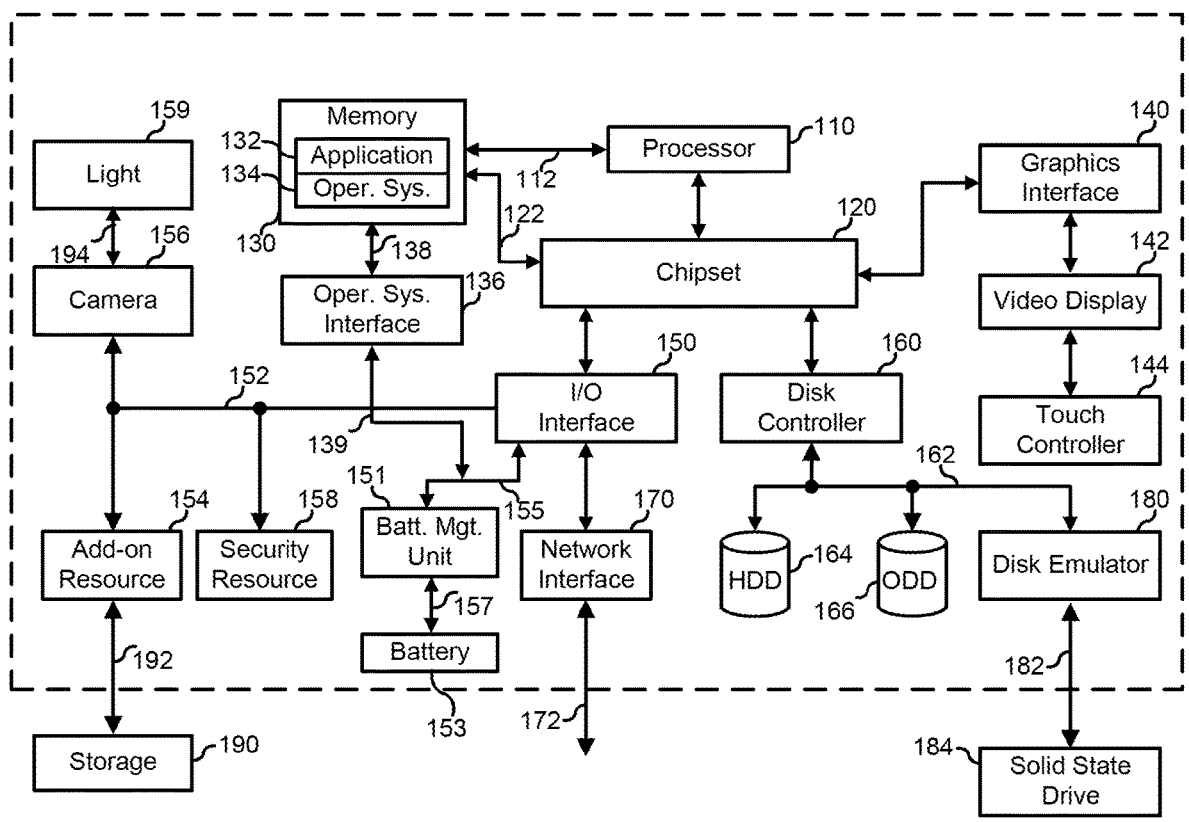
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium options for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described herein, and operates to perform one or more of the methods described herein. Information handling system 100 includes a processor 110, a chipset 120, a memory 130, a graphics interface 140, a disk controller 160, a disk emulator 180, an input/output (I/O) interface 150, and a network interface 170. Processor 110 is connected to chipset 120 via processor interface 112. Processor 110 is connected to memory 130 via memory bus 118. Memory 130 is connected to chipset 120 via a memory bus 122. Graphics interface 140 is connected to chipset 110, and provides a video display output to a video display 142. Video display 142 is connected to touch controller 144 via a touch controller interface. In a particular embodiment, information handling system 100 includes separate memories that are dedicated to processor 110 via separate memory interfaces. An example of memory 130 includes random access memory (RAM) such as static RAM (SRAM), dynamic RAM (DRAM), non-volatile RAM (NV-RAM), or the like, read only memory (ROM), another type of memory, or a combination thereof. Memory 130 can store, for example, at least one application 132 and operating system 134. Operating system 134 includes operating system code operable to detect resources within information handling system 100, to provide drivers for the resources, initialize the resources, to access the resources, and to support execution of the at least one application 132. Operating system 134 has access to system elements via an operating system interface 136. Operating system interface 136 is connected to memory 130 via connection 138.

Battery management unit (BMU) 151 is connected to I/O interface 150 via battery management unit interface 155. BMU 151 is connected to battery 153 via connection 157. Operating system interface 136 has access to BMU 151 via connection 139, which is connected from operating system interface 136 to battery management unit interface 155.

Graphics interface 140, disk controller 160, and I/O interface 150 are connected to chipset 120 via interfaces that may be implemented, for example, using a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof.

Disk controller 160 may be connected to chipset 120. Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 182 includes a USB interface, an IEEE 1194 (Firewire) interface, a proprietary interface, or a combination thereof. Alternatively, solid-state drive 184 can be disposed within information handling system 100.

I/O interface 150 may be connected to chipset 120. I/O interface 150 includes a peripheral interface 152 that connects the I/O interface to an add-on resource 154, to camera 156, and to a security resource 158. Peripheral interface 152 can be the same type of interface as connects graphics interface 140, disk controller 160, and I/O interface 150 to chipset 120, or can be a different type of interface. As such, I/O interface 150 extends the capacity of such an interface when peripheral interface 152 and the I/O channel are of the same type, and the I/O interface translates information from a format suitable to such an interface to a format suitable to the peripheral channel 152 when they are of a different type. Add-on resource 154 can include a data storage system, an additional graphics interface, a network interface card (NIC), a sound/video processing card, another add-on resource, or a combination thereof. As an example, add-on resource 154 is connected to another data storage system 190 via data storage system interface 192. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 120, in another suitable location, or a combination thereof. Network interface 170 is connected to I/O interface 150 via connection 174. Network interface device 170 includes network channel 172 that provides an interface to devices that are external to information handling system 100. In a particular embodiment, network channel 172 is of a different type than peripheral channel 152 and network interface 170 translates information from a format suitable to the peripheral channel to a format suitable to external devices. An example of network channels 172 includes InfiniBand channels, Fibre Channel channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof. In an example, network interface 170 may also include one or more wireless network interface systems for transmission and reception of data or other information via wireless networks that may include WLAN, WWAN, and other wireless network connections.

Camera 156 may be connected to light 159 via connection 194. Light 159 can be controlled to provide illumination of objects of which a photograph or video is being recorded using camera 156. Camera 156 may include a stereoscopic digital camera system. A stereoscopic digital camera system may include a plurality of digital cameras for acquiring plural images of a scene simultaneously or individually.

In accordance with at least one embodiment, camera 156 of information handling system 100 comprises a stereoscopic digital camera system operating as a stereoscopic digital camera system and a stereoscopic digital camera system controller. As an example, the stereoscopic digital camera system and controller can be an INTEL® REALSENSE™ stereoscopic digital camera or another type of stereoscopic digital camera system. As an example, a camera having multiple camera elements at diverse locations to yield parallax information can be used to determine distances of image elements from the camera. In one embodiment, a stereoscopic digital camera system may include composite camera systems having a plurality of image sensors, such as CMOS or CCD sensors, arranged in an array for a camera system 156 and capable of acquiring a plurality of images.

As another example, a camera having a focusable lens to yield differences in sharpness at different distances can be used to determine distances of image elements from the camera. Camera 156 can record a plural images of a scene for use in developing a disparity map for determination of depth within a composite plural image.

Processor 110 is coupled, for example, via chipset 120 and I/O interface 150, to camera 156. Information handling system 100 includes instructions to be executed by processor 110 stored in memory 130, which is connected to processor 110. The code instructions of a multi-view stereo imaging system application cause the processor 110 determine a disparity map of values of differences or pixel shift between two raw images captured with a stereoscopic digital camera system. The stereoscopic digital camera system acquires raw images from two perspective image sensor systems and the raw images are processed into a merged plural image frame. In an example embodiment, the processing of the raw images from the plurality of digital camera sensors of the stereoscopic digital camera system is conducted by instructions 132 such as a multi-view stereo imaging system which may be an application containing instructions executed by a processor. The processing may include 3D processing for depth within a composite plural image frame resulting from merger of the raw image frames. As is understood in some embodiments, raw images may be acquired, the raw images may be rectified to align them according to reference points, field of view, rotation, and other factors. Then, in an embodiment, a disparity map is determined based on reference objects or features in the raw images for pixels associated with a reference area of the image being processed for disparity. As is understood, the pixel shift within the images relative to the reference feature or object and parallax angles for the plurality of digital camera sensors relative to the points or objects within the plural images may be used to determine depth of features in an image. The pixel shift disparity values may be determined with respect to pixels throughout the rectified plural image frame comprised of a plurality of raw images. A resulting disparity map is determined. 3D processing for depth of objects in an image may be calculated by an inverse mathematical relationship of depth distance and distance between digital camera image sensors, parallax angles, and the effect of rectification on those calculations factors as is understood by those in the art. Accordingly, calculation of a disparity map will rely on plural image calibration parameters relating to distance and parallax angles between plural digital camera sensors. The disparity information is used to merge the two raw images into a plural image frame with depth parameters, color, and pixel coordinate information for the plural image frame pixels. It is understood additional processing may occur with respect to determination of plural image frames from the recorded raw images as well. A composite plural image or composite plural image frame as used herein includes a raw image selected as a primary image and pixel disparity information yielded from comparison with a second raw image or may include pixel depth data or a depth mask. In some embodiments, both raw images may be preserved in a composite plural image stored in memory.

The instructions of a multi-view stereo imaging system application may further correlate distances from the stereoscopic digital camera 156 and determine depth-based image segmentation in view of a plurality of image elements, such as features or objects within the scene of the image, according to embodiments of the present disclosure. The instructions cause processor 110 to establish one or more intelligent depth masks for which image filtering may be applied at targeted depth segments within the plural image and, ultimately, in the composite plural image that includes pixel depth value data. For example, image filtering may include selecting an exposure parameter value, or colorization effect, or black and white filtering for at least one of the plurality of image elements in a depth mask relating to one or more image segments.

In an example embodiment relating to application of varying exposure parameters, the instructions cause processor 110 instruct the stereoscopic digital camera system to record the plurality of component images of the scene in a sequence of follow-on images taken by the stereoscopic digital camera system, whereby exposure may be altered between sequential captured images. According to this example embodiment, the image segmentation may be used to select portions of a follow-on images captured at one exposure level, and combine those depth-based segments with another composite plural image wherein the other depth-base image segmentations are captured at another exposure level. This may be done wherein multiple exposure levels are combined into one composite plural image according to depth-based image segments. In an example embodiment, the sequential follow-on images may be taken in relatively rapid sequence, such as used with burst mode image capture, HDR, or similar digital imaging techniques known to those in the art, to minimize differences in sequential images.

In other example embodiments, the depth-based image segmentation described is applied to a composite plural image comprised of simultaneously captured raw images. The multi-view stereo imaging system application instructions may be used to apply image filtering to targeted image segments in post-processing of the composite plural image. A graphic user interface for digital image processing setting may be executed as instructions that are part of the multi-view stereo imaging system application and may be used to apply post processing filtering to depth-based image segments, as is understood in the art. In other embodiments, alternative digital imaging software or image editing software may be used to apply post-processing image filtering or effects via application instructions able to utilize the depth-based image segmentation of composite plural image files to apply image filtering or effects as is understood by those or ordinary skill in the art. The instructions of a graphical user interface associated with the multi-view stereo imaging system for conducting the improved disparity mapping and depth-based image segmentation may cause processor 110 to construct a composite plural image based on at least a portion of the raw images captured an in accordance with various embodiments described herein. The graphical user interface is capable of receiving selection of options or instructions to tailor the various aspects of the multi-view stereo imaging system as is understood by those of ordinary skill in the art. Moreover, it is understood in some embodiments, the graphical user interface may also permit adjustment of a plurality of stereoscopic digital camera settings as occurs with digital camera systems known in the art.

In accordance with at least one embodiment, the instructions 132 of an application, such as multi-view stereo imaging system application, relating to acquiring and processing plural image frames to a composite plural image may cause processor 110 to construct the composite plural image further including improved disparity maps and with intelligent image segmentation according to various embodiments disclosed herein. The improved disparity mapping according to embodiments disclosed herein is used in the composite plural image creation and may yield improved depth determination for the depth mask and depth-based image segmentation in the composite plural image. The improved depth mask and depth-based image segmentation is intelligent with respect to objects or other features in the image and may also improve selection and manipulation of depth-based image segmentation for post-processing functions such as application of image filters, focus, or other image effect applications applied at certain depths within the composite plural images.

In accordance with at least one aspect of improved disparity maps, the instructions cause processor 110 to reduce holes in the disparity map data caused by featureless portions of the acquired images. For example, aspects of the underlying acquired images by the stereoscopic camera system 156 may include areas with increased texture levels such as having a large number of features from which disparity determinations may be more simply made. In other aspects, at least a portion of the scene may have limited texture and features to provide little data for disparity determination. For example, a scene may have portions with low detail such that pixel values over the low detail area have very similar values providing little details for disparity calculation. As result of these low detail areas, holes may form with respect to the disparity map determined from the underlying plural images. Holes include one or more pixel locations for which a pixel disparity value is indeterminate. The pixel disparity value may also be designated at zero in some cases indicating an indeterminate depth. According to aspects of the present disclosure relating to improved disparity maps, the instructions 132 may cause the processor to fill the holes for the disparity map by scanning and sampling nearby areas for disparity map pixel locations having disparity data and applying averaging of nearby disparity values to fill in the holes.

Scan conversion techniques may be used in an embodiment to scan and sample pixel disparity values radially near to one or more pixel holes that for a disparity map hole. Each pixel in a hole having an indeterminate disparity value is referred to as a pixel hole. Additionally, an aspect of improved disparity map determination may include rejection of outlier values. For example, instructions 132, such as a multi-view stereo imaging system application, may determine a histogram of disparity map values for a plural image. Then the instructions may apply an algorithm to determine outlier values that exceed (or fall below) a certain level of deviation beyond expected values of disparity and these may be rejected. It is understood that an inverse proportional relationship may exist between disparity values for pixels and calculated depth or z-values values associated with pixels. Thus, rejection of outliers may be made with respect to either. In other aspects, rejection of outlier disparity or depth values may be made based on whether those values fall above or below a histogram value percentage level.

Any resulting hole in disparity values due to rejection of outlier disparity values may be handled as described herein.

Additional noise reduction techniques may be applied via the instructions 132 and executed via the processor to improve the disparity map yielded from the stereoscopic digital camera system in some additional embodiments. Noise reduction filtering may be applied to the image or disparity map data based on nearby pixel values that still maintain edge preservation to avoid losing clarity of objects and distinction of objects with respect to depth distance determination in the composite plural images. One example noise reduction filter that may be used is a bilateral filter as described further herein.

Upon determining an improved disparity map, generation of an intelligent depth mask may be conducted by the multi-view stereo imaging system application 132. Relating to intelligent depth mask creation, the range of depth values in a scene may be large. In an aspect, the multi-view stereo imaging system application instructions 132 may apply certain rules in the creation of intelligent depth-based image segmentation for enhanced encoding of the depth mask and depth values into the composite plural image resulting from the 3D processing. In accordance with one example embodiment, intelligent image segmentation may be conducted on a smoothed histogram of disparity values to determine peaks of disparity values inversely corresponding to certain depth distances, and therefore one or more potential objects in an image. Application of heuristics may be used to sharpen the peaks indicating probable objects and narrow the spectrum of values for the peaks around the max values detected at each peak. This permits fewer bits assigned to objects upon encoding and allows an entire object to be isolated with a single image depth segment for later access and processing. Similarly, the valleys between peaks of histogram disparity values indicate gaps between potential objects in the image. Thus, the image depth segments are statistically correlated to objects, but may utilize fewer bits in the encoded depth mask by narrowing the spectrum of encoded depth values associated with an object. Similarly, depth gaps between objects may be enhanced by widening the spectrum of values associated with the depth gaps and providing for more encoded values to the depth gap spectrum. This may highlight depth differences between image objects in later manipulation and processing of the composite plural image. Similarly, in post processing of the image with depth values, entire objects may be easily selected, manipulated, and accessed. Thus, intelligent image depth segmentation achieves grouping ranges of distances associated with objects to a narrower spectrum of values so that when selected, the entire object is selected.

In this way, the instructions 132 provide for a statistical correlation in creating the depth mask such that image segmentation is automatically correlated with potential objects in the image. Additionally, the instructions 132 for improving the composite image determination, intelligent image segmentation, and depth mask generation may include encoding the depth spectrum of disparity data or depth data for pixels to particular image depth segments. Narrower spectrums for an image segment may be used to associate the segment with an object in the image. Wider spectrums may be used between object to accentuate distance between objects for the purposes of improved image segmentation. As a result of selective application of data spectrums to the depth mask determination via the instruction and as described further herein, improved image segmentation may result. In yet another aspect of intelligent depth mask determination, groups of objects associated with pixels having certain depth values may be grouped by the instructions 132. Pixel assignment may be increased with respect to image segments between objects or groups of objects in an example embodiment and fewer pixels may be assigned to depth segments with an object or higher concentration of objects. This may be done to permit selection of a depth distance to encapsulate all depth values and pixels associated with one or more objects at a depth segmentation level. When one depth is selected, the narrowed spectrum of depth values means all depth values associated with the object are selected as well and occupy one encoded bit value. Depth values are encoded with respect to the intelligent depth mask in the composite plural image in another aspect by application instructions 132. Additionally, significantly improved image processing may take place with utilization of these image segments such as application of image filters to the resulting composite plural image, for example a 3D image.

In an aspect, the instructions 132 may apply certain rules in the creation of the depth mask with depth-based image segmentation for encoding the depth mask and depth values into the resulting composite plural image. Encoding of the depth mask may take place upon determining the depth values from the disparity values and applying an encoding algorithm. In an example embodiment, all depth values may be encoded within a range of bits of 0-255. With the limited number of bits for encoding depth in the depth mask for each pixel in the image, the multi-view stereo imaging system application program enhances encoding the bits to depth ranges of importance such as those for near-distance pixels. In an example embodiment, range inverse encoding may be used to increase the number of pixel values assigned to pixels having near depth values. In many instances, nearer depth values are more relevant in an acquired image since many images will have objects located in nearer depth locations. Accordingly, encoding the depth mask encoding with range inverse encoding may be conducted such that more bits in the depth mask are assigned to the foreground values. Allocation of additional bits to foreground depth segmentation ranges is done in recognition of the typical case that objects and features in the foreground of an image are often of greater importance or interest. In doing so, users will have an easier time choosing or manipulating objects in the foreground image segments associated with those objects.

Figure 2:
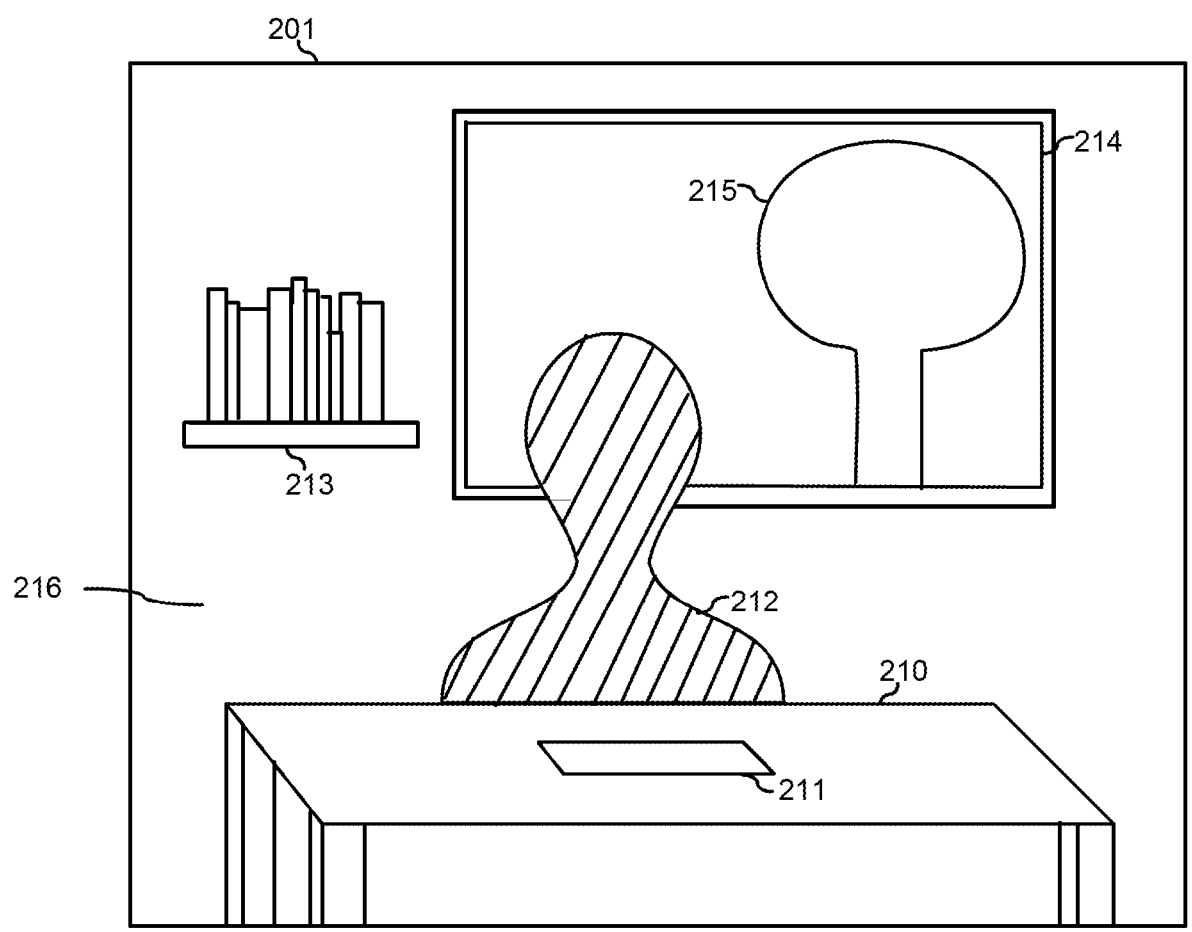
FIG. 2 is a display image diagram illustrating an image of a scene having objects at different distances from a digital camera system, according to an embodiment of the present disclosure.

FIG. 2 is a display image diagram illustrating an image of a scene having objects at different distances from a stereoscopic camera system, wherein the objects are represented by image elements such as image pixels, according to an embodiment of the present disclosure. Image 200 comprises a scene 201 having objects 210 through 215. Objects 210 through 215 are located at a variety of distances and ranges of depth of distance from a stereoscopic digital camera, such as camera 156. For example, object 210, which represents a desk, is in a near foreground. Objects may contain texture and image features. Texture aspects and image features of object 210, for example, may include desk edges, desk legs, and the desk table top. The desk edges and legs may have high texture whereas the table top may have low texture in parts. Object 211, which represents a tablet, is illustrated as resting on object 211 and is also in the near foreground. Object 212, which represents a person sitting behind the desk, is illustrated in a moderate foreground, in a less extreme foreground position than object 210. Object 213, which represents a bookshelf on a wall behind the person represented by object 212, is in a moderate background relative to object 212. Object 214, which represents a window, is located in a depth plane substantially identical to that of object 213, so it is also in the moderate background. Object 215, which represents a tree visible through the window represented by object 214, is in a far background, farther from the stereoscopic digital camera than objects 213 and 214 in the moderate background. Object 216 may be a space of featureless wall located at a similar depth to bookcase 213 and window 214. Because wall space 216 may have very little texture and features, anomalies or errors may arise relative to determined disparity map values in such an area.

The three-dimensional relationships illustrated in FIG. 2 can be discussed with respect to x, y, and z axes, wherein the x axis is defined as being a horizontal axis, the y axis is defined as being a vertical axis, and the z axis is defined as being a distance axis along a path through the plane of image 200 away from a point of view of the stereoscopic digital camera capturing image 200. The z-axis may also be referred to as depth. In accordance with at least one embodiment, depth distance information may be obtained from the stereoscopic digital camera via determination of a disparity map by assessment of pixel shift between a plurality of raw images captured for the scene using identified features such as object edges or other features. With the disparity map reflecting pixel shifts within the scene within the image, distances are assigned to image pixel elements of image 200 recorded from the stereoscopic digital camera. The depth distances may be assigned values to each pixel based on the depth of the respective portion of the scene in the image. Patterns of image elements, such as pixels for example, within the region occupied by object 212, can be recognized by their proximity in x, y, z space. Once recognized, such patterns can be used to identify objects, such as object 212 and its relation to other objects, such as objects 210, 211, and 213-216, in the x, y, z space. Then, image processing can be performed with respect to each identified object or plurality of objects that are at a particular z distance or range of z distances. As discussed herein, intelligent depth mask creation with depth-based image segmentation may be assigned to a composite image to make selecting an object in an image or manipulating one or more objects in an image easier and more distinct than without improved disparity map determination or intelligent depth mask generation. Additionally, by performing image processing on an object-by-object basis, or for objects within a range of z-distances, the integrity of the appearance of each object can be preserved. For example, if object 214, as a window, provides a strong backlight that might otherwise result in other objects, such as object 212, being underexposed, object-by-object image processing, or processing by range segmentation of z-distance values that encompass the window, can allow the exposure of object 214 to be reduced so it is not overexposed without necessarily reducing the exposure of object 212 and causing it to be underexposed. One or more additional images may be obtained using the stereoscopic digital camera, for example, to alter the exposure of identified objects. As one example, a lesser exposure image may be made to reduce overexposure of a brighter object, such as object 214. Lesser exposure can be obtained, for example, by reducing exposure time, by reducing a lens aperture, by reducing a photoreceptor sensitivity, by adding or increasing a neutral density filter, or by another technique. As another example, a greater exposure image may be made to increase underexposure of a darker object. Greater exposure can be obtained, for example, by increasing exposure time, by increasing a lens aperture, by increasing photoreceptor sensitivity, by removing or decreasing a neutral density filter, or by applying illumination. Illumination may be applied, for example, by turning on an illumination source, such as a light associated with the camera. The intensity of such illumination may be modulated, for example, using pulse width modulation, to provide precise control over the amount of illumination being applied.

In other embodiments, it may be appreciated that object by object image processing may be useful for application of image filtering of other types to generate certain effects or to improve clarity of the composite plural image overall. For example, black and white filtering, color filtering, focus, and application of various other photographic effects may be applied to an object or a plurality of objects within a depth segmentation. For example, to apply color, to filter color yielding black and white, or to filter a focus level at a certain image depth segment correlating to one or more objects in an image may serve to highlight or deemphasize those one or more objects in an image.

Figure 3:
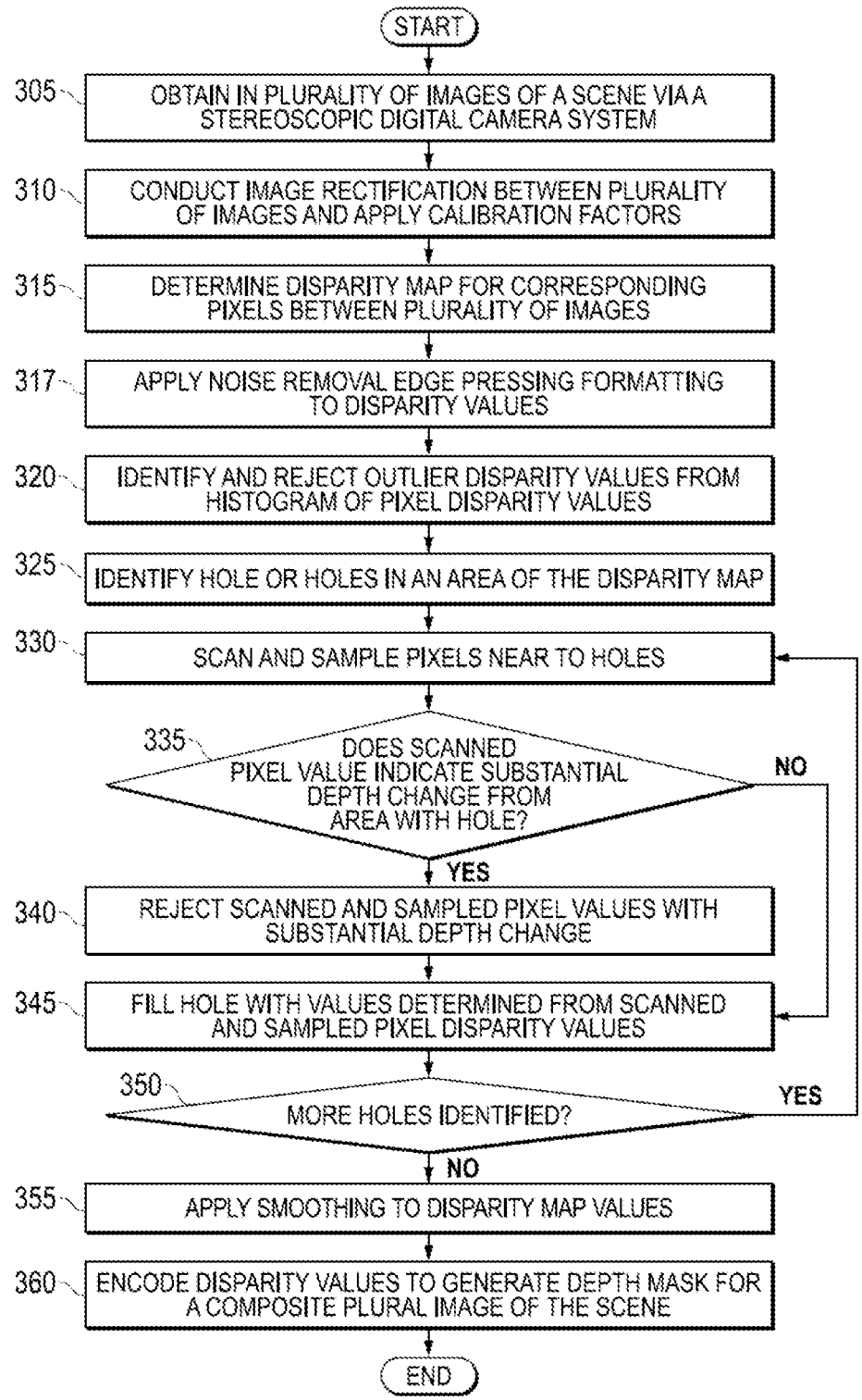
FIG. 3 is a flow diagram illustrating a method of constructing a composite plural image having a depth mask by determining a disparity map based on distances between image elements according to an embodiment of the present disclosure.

FIG. 3 is a flow diagram illustrating a method of constructing a composite image with an improved disparity map generated from images captured with a stereoscopic digital camera according to an embodiment of the present disclosure. In accordance with at least one embodiment, a method is performed in an electronic information handling system. The method may be performed by a software application such as a multi-view stereo imaging system application. Method 300 begins in block 305. In block 305, a stereoscopic digital camera systems is used to acquire plural raw images from two different perspectives with two digital camera sensors. As described above, the stereoscopic digital camera system may be a composite digital camera system with an array of digital camera sensors or may be separate digital camera systems oriented at a fixed distance from one another and with known parallax angles with respect to one another. The plural raw images may be similar to the example embodiment shown in FIG. 2. Plural images may be acquired simultaneously or in sequence with one another. If in sequence, images of a scene taken closer in time to one another will yield comparable raw images in an example embodiment, but similar image scenes are not required to determine disparity in all cases. A multi-view stereo imaging system application may execute code instructions via a processor as described above in an information handling system to cause the stereoscopic digital camera system to acquire the raw images. For example, the multi-view stereo imaging system application may respond to a touch input received from a touch screen display via a graphical user interface as is understood in the art. In other embodiments, buttons or other peripheral input devices may be situated on an information handling system to receive a command from a user to acquire one or more images of a scene.

The flow proceeds to block 310 where the multi-view stereo imaging system may perform rectification between the plurality of raw images acquired. Rectification of the plural images may include substantially aligning the field of view for the image of a scene taken so that the plural raw images are of similar scope for comparison. Additional rectification may include substantially aligning rotation of images for comparison of raw images. In yet another example embodiment, vertical or horizontal alignment of the images may be made to substantially align features or objects within the images and edges of the images. It is understood that rectification may not require perfect alignment of field of view, rotation, or horizontal or vertical image features and not all aspects of any of the above may be aligned. In other words, not all features or objects will be aligned for example in horizontal or vertical alignment. Only one center line in the horizontal and/or vertical may be aligned in some example embodiments. The image rectification is done to permit comparison of pixel shift disparity for objects or features appearing at pixels within the acquired raw images. It is understood that other rectification parameters may also be used to align the images to ensure calibration and allow comparison to generate a disparity map as a preliminary step for establishing depth values and a depth mask. Rectification may be required in circumstances where the stereoscopic digital camera system image sensors have shifted or moved out of alignment or where the plural raw images are acquired by distinct types of cameras. For example, an information handling system may have a wide-angle camera and a more standard digital camera available to acquire plural raw images. In such an example, rectification of the wide-angle camera field of view may be necessary with the standard field of view digital camera.

Proceeding to block 315, the multi-view stereo imaging system application executes code instructions to determine a disparity map relating to pixel shift between the acquired raw images. Features, such as the edge of objects in a scene or other aspects of texture in the acquired images, are used to compare pixel location between the acquired plural raw images. The pixel shift value is the disparity value assigned to a pixel associated with one of the acquired images. The selected image to assign disparity values is the primary image in an example embodiment and these assigned disparity values are associated with the pixel locations of that primary image. This generates a disparity map for the acquired plural raw images. The primary image with the stored disparity values is referred to as a composite plural image or composite plural image frame. With the stored disparity values, an inverse proportional relationship between the pixel shift and the depth exists based on known values of distance between the digital image sensors, parallax angles, rotation, and horizontal or vertical relationships among digital images. The disparity values may be used to determine depth values associated with pixels. In an example embodiment, depth may be calculated from disparity between images captured from two image sensors of camera systems as follows:

Z=focal length(in pixels)*baseline level(in meters)/ disparity (in pixels), where Z=a distance along the camera's z-axis (in meters) and the baseline level is known from settings or calibration of parallax angles and depth distances for the dual camera image sensors in the multi-view stereo imaging system.

At block 317, the multi-view stereo imaging system application instructions may further process the disparity map values to provide a further improved disparity map determined from the acquired plural raw images according to an embodiment. Noise removal smoothing may be applied to the disparity map values to limit noise and smooth peaks within the disparity map values. For example, bilateral filtering may be applied to the values in the disparity map to reduce noise while preserving edges within the data. In another embodiment, bilateral filtering may be used on the disparity map as is understood by those of ordinary skill in the art. The bilateral filtering function may be applied to the pixel disparity values yielded from the disparity map. The bilateral filter function applied to the disparity values may yield noise reduction and smoothing of sudden disparity transitions while still preserving edges as may be shown. An example embodiment of a bilateral filter may be defined as follows:

$$I^{filtered}(x)=1/W_P \Sigma_{xi \text{ set of } \Omega} I(x_i) f_r(\|I(x_i)-I(x)\|) g_s(\|x_i-x\|),$$
where $W_P=\Sigma_{xi \text{ set of } \Omega} f_r(\|I(x_i)-I(x)\|)g_s(\|x_i-x\|)$.

$I^{filtered}$ is the filtered disparity map; I is the original disparity map; x are the coordinates of the pixel to be filtered; Ω is the window centered on x; $f_r$ is the range kernel for smoothing differences in disparity values; and $g_s$ is the range kernel for smoothing differences in coordinates.

Other edge-preserving noise reduction may also be applied to smooth the disparity map value data.

As described above, determination of disparity values for plural images taken with stereoscopic digital camera systems associated with an information handling system may be noisy or contain a certain amount of error values or missing values. Missing values or values that are in error may generate holes in the data of the disparity map of a composite plural image. This may be especially true for low cost digital cameras used with a stereoscopic digital camera system in an information handling system. Accordingly, depth determinations may be in error and require substantial post-consolidation processing. With the presently described embodiments, an improved disparity map may be generated by the multi-view stereo imaging system application during generation of a consolidated plural image.

At block 320, the multi-view stereo imaging system application code instructions may be executed via a processor to generate a histogram of disparity values determined within the disparity map of the acquired plural image. An example histogram is show at FIG. 5 and discussed further herein. The example histogram of disparity values may include values that are above, or below, certain determined outlier threshold values. If above or below the established threshold value, disparity values may be rejected as outliers. The multi-view stereo imaging system application may assess the histogram data and, according to code instructions, rejects data values found to fall in the outlier criteria. The rejection of outlier values leaves unknown values associated with pixels in the disparity map. These unknown values may be treated as holes in the disparity map in accordance with disclosures herein. In other example embodiments, it may be assumed that disparity values in the generated histogram must fall within a range of 5% to 95% where values that fall above or below the 5% to 95% range of values are rejected as outliers via instructions of the multi-view stereo imaging system application. It is understood that any threshold value may be selected or any outlier percentage ranges may be selected to designate rejection of outlier disparity values in the multi-view stereo imaging system application. It is also understood that rejection of outlier values may not require the disparity values be in a histogram for rejection of outlier values to occur. The threshold of outliers may additionally be determined dynamically by a percentage of pixels. For example, a threshold may be set to include pixel disparity values that fall at or under 99.5% of all pixels. It is understood that any percentage value of all pixel disparity values for image pixels may be utilized in the outlier rejection. In some further embodiments, the multi-view stereo imaging system application may only reject values at the higher end of disparity values since the lower values may represent closer depth or z-values within an image and may be deemed more reliable. The larger disparity values will appear as very close points and cause unwanted skew to the encoded depth mask. Such outlier values may also create problems or increased difficulty in encoding the depth mask. In an example embodiment, outlier disparity values may be set above a threshold value of 28 as in the example histogram of FIG. 5.

Flow proceeds to block 325 where the multi-view stereo imaging system application executes instructions to identify holes or indeterminate disparity values in the disparity map associated with the acquired plural image. Although the histogram shown in FIG. 5 contains disparity values determined from the disparity map in accordance with disclosures herein, one or more pixels may have an indeterminate or zero value in that the disparity is not or could not be determined for that pixel or that the disparity value for that pixel was rejected as an outlier. For example, in the case of portions of an image scene lacking texture, a pixel disparity between two raw plural images may be difficult or impossible to determine due to lack of any reference features. An example of a low texture portion of an image scene may be an area of blank wall such as described below in FIG. 4. The lack of detail or features causes the difference between two or more image pixels unidentifiable and thus yielding a hole. Pixels in such an area of low texture may be left with an indeterminate value for pixel disparity shift, and in such cases result in holes in the disparity map. One or more pixel holes may comprise a disparity map hole. At 325, the multi-view stereo imaging system application determines the location of holes in the disparity map. In another embodiment, pixel hole identification may occur upon determination of the disparity map such as above at 315. During determination of the disparity map at 315, it is determined that two or more pixels in certain regions are unidentifiable with respect to a difference due to lack of features or texture in the image. The steps recited in FIG. 3 may be conducted in any order and the order of determinations may be changed in a variety of ways as is understood by those in the art. Flow proceeds to block 330.

At block 330, the multi-view stereo imaging system application selects one pixel hole and scans nearby pixels having disparity values associated with them and samples the values of those nearby pixels. In an example embodiment, the scanning and sampling may be radially conducted for pixel disparity values around the identified pixel hole. In another example embodiment, the multi-view stereo imaging system application executes instructions to begin with pixel holes in or near regions where pixels in the pixel map are mostly filled with disparity values. In a further embodiment, the multi-view stereo imaging system application may execute instructions to scan through the disparity values of the entire image disparity map. In an example embodiment, the scanning may occur left-to-right and then right-to-left or vice-versa. Then the assessment of values in radial locations near the pixel hole may be determined at progressively greater distances from the pixel hole. In a particular embodiment, scanning and sampling of pixel disparity values may utilize scan conversion techniques applied to the disparity map to obtain disparity pixel values radially proximate to a pixel hole and to fill in disparity map holes having the one or more pixel holes.

Proceeding to decision diamond 335, the multi-view stereo imaging system application assesses whether scanned pixel values across the image disparity map indicate a substantial change from the disparity value of pixels nearby to the pixel hole. The multi-view stereo imaging system application may thus determine an edge of an object which will skew the averaging of nearby pixel disparity value if included in the hole filling technique.

Flow proceeds to block 340 if a scanned pixel is determined to have a pixel value substantially different from those in the image area of the disparity map hole. The multi-view stereo imaging system application will determine if a scanned pixel disparity value is substantially different from other nearby scanned pixel disparity values to indicate an edge of an object at a different depth. In many cases, an edge of an object has texture and will have determined disparity values, however determining a substantial disparity value transition allows the multi-view stereo imaging system application to reject value not appearing at a similar depth distance to the area of the image scene having the disparity map hole. If a substantial change in disparity value is detected at a scanned pixel nearby to a hole indicating a substantial depth change, then the multi-view stereo imaging system application will reject the scanned pixel value from inclusion in the hole-filling determination for that hole in the disparity map. Flow then proceeds to block 345. If no substantial disparity value transition is detected for a scanned pixel at decision block 335, then that pixel disparity value will be included in the hole-filling determination conducted by the multi-view stereo imaging system application. Flow will then proceed to block 345.

At block 345, the multi-view stereo imaging system application will take an average of radially sampled disparity values for pixels close to the hole in the disparity map and assign the average disparity map value to the pixel hole. Weighting factors may also be applied to the averaging of scanned pixel disparity values in some embodiments. For example, scanned pixel disparity values radially closer to the location of the hole may be weighted more in the averaging than to those further away to maximize the effect of those values on the disparity value yielding to fill the hole in some embodiments. Additionally, multi-view stereo imaging system application will set a limit of radial distance from the hole location in which pixel disparity values will be included in the averaging to yield a hole-filling value. In an example embodiment, a radial limit may be 1,000 pixels radially from a location of a pixel hole. In other embodiments, it is understood that more or fewer pixels radially located from the hold may be used in the averaging of values. It is understood, that nearby holes or pixels with indeterminate values will not be included in the averaging calculation of nearby pixel disparity values to yield a hole filling pixel value.

Upon determining a hole-filling pixel value, the determined pixel value is assigned to the pixel having the identified hole and this value is saved in the disparity map associated with that pixel location. Scan conversion techniques may be applied to the disparity map to fill pixel holes within the disparity map holes in accordance with embodiments disclosed herein. Given a polygon of an image space comprising a disparity map hole and nearby pixels with disparity values, an averaged or weighted averaged disparity value may be determined and used to fill the pixel holes intersecting with the polygon pursuant to scan conversion techniques similarly used in computer graphics.

Flow proceeds to decision block 350, the multi-view stereo imaging system application determines whether additional holes remain unfilled. If an additional hole remains, the flow recursively proceeds back to block 330 for the multi-view stereo imaging system application to scan and sample nearby pixels and determine a hole-filling value to be assigned to the hole in the disparity map. This may be repeated until all holes are filled. In one embodiment, if a hole comprises several pixels in a similar area, a hole-filling value may be weighted heavily in determination of hole-filling values to be assigned to neighboring pixels with indeterminate disparity values. In yet another embodiment, the hole-filling value yielded for a pixel with an indeterminate pixel disparity value may be assigned by the multi-view stereo imaging system application to adjoining or nearby pixels with indeterminate disparity values. For example, a polygon may be assigned to a disparity map hole area and scan conversion applied to fill all pixel holes in a disparity map hole. In this way, a hole with a plurality of pixels with indeterminate values may be filled more efficiently and take less computational resources. A limit on application of previously determined hole-filling values or weighting of previously determined hole-filling values may apply to only nearby pixels within a limited radial distance of the originally determined hole-filling value determine for a pixel hole location. For example, the limit may be the same as the radial limit of pixel values used to determine the averaged pixel disparity value for hole-filling in an example embodiment. It is understood that other range limits are contemplated and may be used as well.

At block 355, the multi-view stereo imaging system application instructions may further process the histogram of disparity map values to provide a further improved disparity map values segmentation determined from the acquired plural raw images according to an embodiment. Smoothing of the histogram of disparity values may be applied to avoid local minima or maxima and smooth peaks within the histogram of disparity map values. This is later helpful for determination of peaks associated with an object or group of objects such as with a histogram assessment for segmentation. An example of histogram smoothing is shown below in FIG. 5. In an example embodiment, Gaussian smoothing or weighted averaging smoothing techniques may be applied as is understood in the art. In another example embodiment, curve-fitting applied to histogram values such as by application of a spline function. Other histogram smoothing functions may also be applied as is understood to be applicable in the art.

At block 360, the multi-view stereo imaging system application instructs a processor in some embodiments to encode the disparity values into a depth mask to be associated with the composite plural image of a scene. Any encoding may be used to convert the disparity values, or their corresponding depth values into the depth mask. In an example embodiment, values of 0-255 bits are used for encoding the depths calculated within the image scene via the proportional inverse of the disparity values. The encoding may assign bit values in equal distribution from a minimum depth value to a maximum depth value in equal depth portions as in linear range encoding. In another embodiment, range inverse coding may be used to assign the 0-255 bits across range of depth values between the minimum and maximum depth values. In an example embodiment, range inverse coding may be applied as follows:

$$depthMask(i)=255*(depthFar*(Z(i)-depthNear)/Z(i)*(depthFar-depthNear),$$

where: depthMask(i) is the encoded depth value of a pixel; depthFar is the maximum depth value; depthNear is the minimum depth value; and Z(i) is the actual depth value of a pixel to be encoded.

As a result of application of range inverse coding, depth values encoded into an 8 bit mask, for example, will assign more encoded bits to nearer values and thus to foreground objects and features than bits assigned to distant portions of the composite plural image scene. This is done on an assumption that nearer portions of a composite plural image scene are more important. For example, in many image scenes, many of the objects of interest in an image scene are in the foreground portion. As a result, accessing foreground objects in a composite plural image, such as a 3D image, for the purpose of manipulation or application of post-processing image filters or application of image effects to objects within an image may be more precise. Depth masks generated from improved disparity maps, smoothing and encoded with range inverse encoding, give improved results when depth-based filtering or other functions are performed using depth based segmentation and determination of objects within and composite plural image. At this point, the flow ends.

Figure 4:
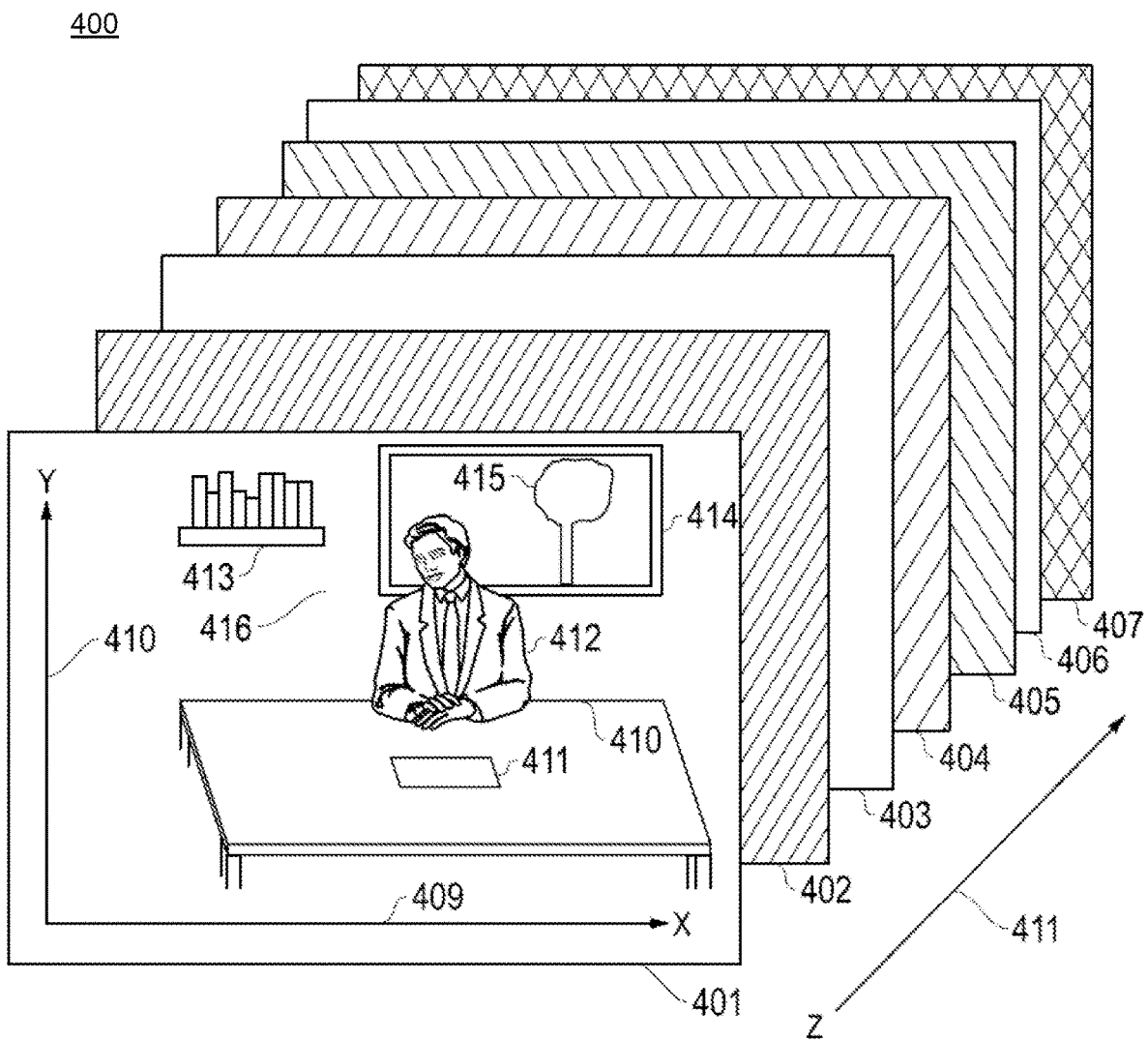
FIG. 4 is a block diagram illustrating a range of depths, including variable distance ranges for objects in a scene and gaps between objects according to an embodiment of the present disclosure.

FIG. 4 is a block diagram illustrating a range of depth of distances of objects in a scene from a stereoscopic digital camera among other distances and their relative spatial relationships according to an embodiment of the present disclosure. In the illustrated example, image elements may be considered to be located at a z-distance from a point of view of a stereoscopic digital camera that places them in any of distance segmentations 401-407 located at different distances along a z axis 411. While each of the distance segmentations 401-407 appear to be distance planes, this is done for illustration. In the present disclosure, the distance planes of FIG. 4 represent a distance segmentation encompassing a range of distances within the distance segmentation of a depth mask. The distance segments may also vary in range of distance values encompassed within each segment according to embodiments of the present disclosure. Each of distance planes 401-407 also spans a range of area defined with respect to x axis 409 and y axis 410. As shown by elements having no shading or various types of cross-hatching, image elements representing an object in a scene may lie substantially within distance segmentations such as 401, 403, 405 and 407. Non-shading of distance segmentation 401 is correlated with near objects 410 and 411 representing a desk and a tablet computer. Hatching of distance segment 403 correlates with object 412 representing a person. Hatching of distance segment 405 correlates with object 413 the wall bookshelf and object 414 the window that fall within a distance range of segment 405. The object 415 of the tree in the background seen through window 414 is hatched to correlate with distance segment 407. As further shown, adjacent distance segments 402, 404, and 406 represent gaps or distances between distance segments associated with one or more objects. In an example embodiment, encoding for distance segments 402, 404, and 406 may encompass a greater range of distance values than distance segments representing one or more objects found within a distance range. Distance segments 402, 404, and 406 are shown with no hatching. Object 416 represents a blank wall that may have few features for determination of disparity map values. As discussed further below, the system of the present disclosure may sample and scan nearby disparity map values associated with pixels. For example, pixels associated with nearby bookshelf 413 may be sampled and used to fill in holes for pixels at 416. Similarly, pixels of window 414 may be nearby and scanned as well to provide data with which to fill holes for pixels at 416. In an aspect, the person 412 or desk 410 may have a z-value substantially different from measured values determined for pixels at 416 that pixels at 412 or 410 may be rejected along the edges of those objects. Accordingly, pixels associated with the objects 412 and 410 may not used in filling holes in nearby spaces of the blank wall and may not factor into filling holes associated with pixels at 416.

Distance segments 401, 403, and 405 can be recognized as representing one or more objects making selection of the one or more objects within a distance segment simpler. A distance segment containing the object may be adjusted and optimized over the area of the image that corresponds to the object such that the entire object is selectable within a narrow depth segmentation in accordance with embodiments herein. Application of image processing, such as application of image filters, may then be made with respect to individual distance segments which are recognized as representing one or more objects.

Figure 5:
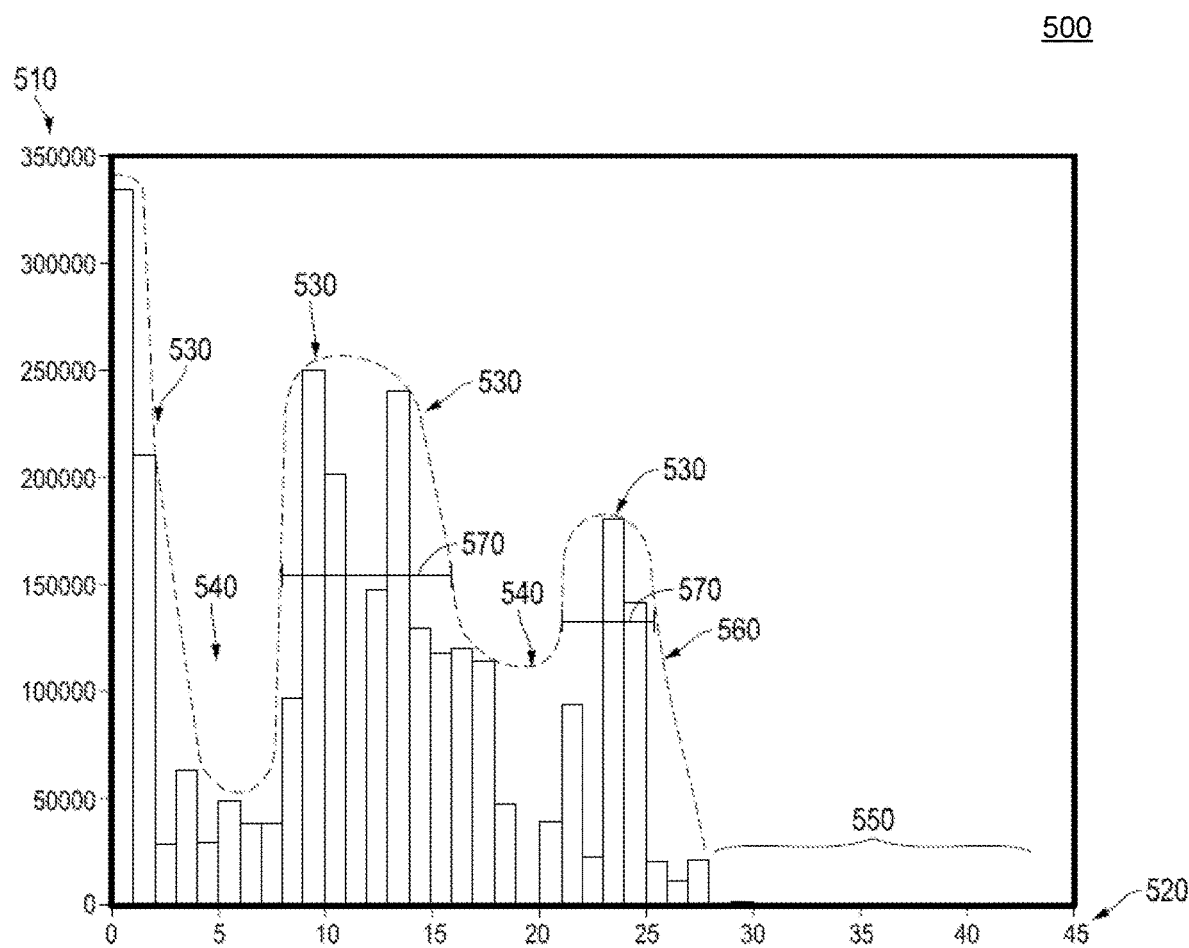
FIG. 5 is an example histogram of disparity values yielded from a disparity map for an example plural image according to an embodiment of the present disclosure.

FIG. 5 is an example histogram of values for a plural image acquired via a stereoscopic digital camera system according to an embodiment of the present disclosure. Instructions executed on a processor, such as a multi-view stereo imaging system application, may generate a histogram of disparity values across pixels in the plural image by determining the frequency of disparity values occurring in the disparity map. In other example embodiments, the histogram may be determined from the disparity map based on the frequency of disparity values that fall within a range of disparity values. The histogram of FIG. 5 shows a frequency of pixels at given disparity values. At 510, shown is the y-axis of the histogram indicating a frequency of pixels in a plural image. At 520, the x-axis depicts disparity values yielded from the plurality of raw images captured by the stereoscopic digital camera system. It is understood that an inverse relationship exists between the disparity values and calculated depth values, also referred to as z-values, based upon calibration factors, including parallax angles and distances between stereoscopic digital camera sensors, for the two or more captured images from a stereoscopic digital camera. The data shown in the histogram of FIG. 5 is understood to be example data for purposes of illustration only and not necessarily tied to any particular image shown in the present disclosure.

Peaks in the histogram are shown at 530 and valleys are shown at 540. Peaks 530 indicate a substantial number of pixels having a depth value or pixel disparity value. The plurality of depth values or pixel disparity values in a peak 530 suggests one or more potential objects or other features may be found at a depth distance associated with the peak of disparity or depth values in the image. Valleys 540 suggest an absence of pixel disparity values and suggest a lack of objects or other features within a range of depth values in the valley 540. Thus, valleys 540 may indicate gaps between one or more potential objects or other features in the image.

At 550, the histogram shows example outlier values for disparity values. Outlier values may be determined, as described above based on a threshold value. In the example embodiment of FIG. 5, outlier values may be defined as values above 28 as shown. Other bases of determining outlier values found in the histogram may be made based on percentages above expected values and the like as is understood by those of skill in the art.

Also shown is the application of a smoothing function to the histogram of pixel disparity values at 560. The smoothing function may be applied to the values of the histogram of disparity values via a curve fitting function where a spline value of each histogram bar value is used to curve fit a smoothed curve showing peaks within the histogram and reducing noise.

In this way, groupings of peaks may be discerned within the histogram as a single peak of disparity value after smoothing, and application of intelligent segmentation within the encoded depth mask may be applied as described herein. At 570, a close neighborhood of pixel disparity values are shown for peaks 530 of the histogram. The pixel disparity value range limits defining the close neighborhood may be set at any level. The range limit may depend on the peak width of 530. In other embodiments, the close neighborhood of pixel disparity values may have a range set at specified value. For example, a close neighborhood of pixel disparity values of +/−3 from a peak 530 maximum may be used. In one embodiment, the close neighborhood of disparity values may be shifted to pixel disparity values closer to the histogram peak maximum disparity value to sharpen peak 530. For example, each pixel disparity value in the close neighborhood range may be shifted by one or more disparity values closer to the pixel disparity value maximum of the peak 530. In another embodiment, the close neighborhood of disparity values may be shifted to equal the peak disparity value maximum to sharpen the disparity value peaks 530. In this way, intelligent image segmentations may be achieved such that most of an object or objects in a depth range, reflected by peaks 530 in the disparity values, may be grouped under a narrow spectrum image depth segmentation level.

Figure 6:
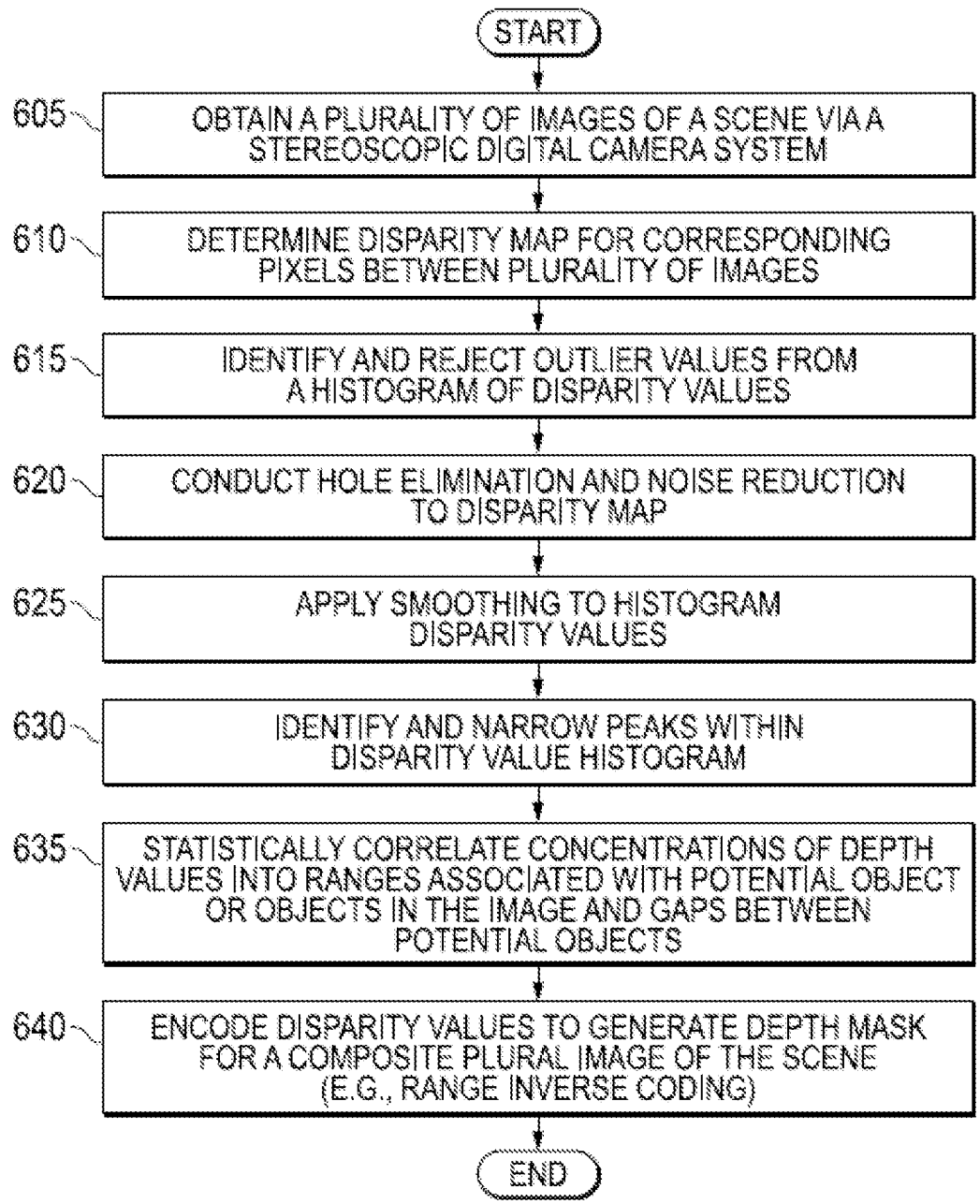
FIG. 6 is a flow diagram illustrating another method of constructing a composite image with at least one depth mask according to an embodiment of the present disclosure.

FIG. 6 is a flow diagram illustrating a method of constructing a composite plural image with intelligent depth-based image segmentation within a depth mask of the composite plural image according to an embodiment of the invention. Method 600 begins in block 605 where the stereoscopic digital camera system acquires a plurality of raw images of a scene. In accordance with at least one embodiment, a method is performed in an electronic information handling system operating a processor executing instructions of a multi-view stereo imaging system application operating with drivers for the stereoscopic digital camera system. In block 305, the stereoscopic digital camera systems is used to acquire plural raw images from two different perspectives with two digital camera sensors. As described above, the stereoscopic digital camera system may be a composite digital camera system with an array of digital camera sensors or may be separate digital camera systems oriented at a fixed distance from one another and with known parallax angles with respect to one another. The plural raw images may be similar to the example embodiment shown in FIG. 2. Plural images may be acquired simultaneously or in sequence with one another and may be acquired in response to receiving commands from a user via a graphical user interface.

The flow proceeds to block 610 where the multi-view stereo imaging system may determine a disparity map for corresponding pixels in relation to features or objects by comparison of the acquired raw images. The disparity map has pixel shift values with respect to features such as texture or object points between the two raw images. Features, such as the edge of objects in a scene or other aspects of texture in the acquired images, are used to compare pixel location between the acquired plural raw images. The pixel shift value is the disparity value assigned to a pixel associated with one of the acquired images. The pixel shift value is inversely proportional to depth of the feature or object in the image due to relationship of parallax angles from a two digital image sensors at a known distance from one another. Depending on the digital cameras used to comprise the stereoscopic digital camera system or their level of calibration, the multi-view stereo imaging system may be used to perform rectification between the plurality of raw images acquired. Rectification of the plural images may include substantially aligning the field of view for the raw images of a scene taken so that the plural raw images are of similar scope for comparison. Rectification may be made with respect to field of view, rotation, vertical or horizontal alignment, and other factors.

Proceeding to block 615, the multi-view stereo imaging system application code instructions may be executed via a processor to generate a histogram of disparity values found in the disparity map of the acquired plural image. An example histogram is shown at FIG. 5 and discussed further herein. The example histogram of disparity values may include values that are above, or below, certain determined threshold values. The multi-view stereo imaging system application may assess the histogram data and, according to code instructions, reject data values found to fall into the outlier criteria. The rejection of outlier values leaves unknown values associated with pixels in the disparity map. These unknown values may be treated as holes in the disparity map in accordance with disclosures herein. In example embodiments, thresholds for determining outlier values may be defined disparity values at an upper or lower bound or may be a range values assumed to fall within a percentage of the whole, such as below 95% of all disparity values or below 5% of all disparity values. Disparity values that fall below the 5% or above the 95% range of values may be rejected via instructions of the multi-view stereo imaging system application. It is understood that any threshold value or percentage may be selected to determine outliers. In some embodiments, the multi-view stereo imaging system application may only reject values at the higher end of disparity values.

At block 620, the multi-view stereo imaging system application executes instructions to fill holes in the disparity map with disparity values determined based on nearby pixel disparity values. For example, the multi-view stereo imaging system application may identify holes or unknown values within the disparity map associated with the acquired plural image. One or more pixels may have an unknown or zero value in that the disparity is not or could not be determined for that pixel or that the disparity value for a pixel was rejected as an outlier from a histogram of disparity values.

The multi-view stereo imaging system application determines the location of holes in the disparity map. Upon determining a location of a hole, the multi-view stereo imaging system application operates to computationally shrink the disparity map hole by utilizing a fill-in process for indeterminate disparity values located at pixel holes in the disparity map hole. The multi-view stereo imaging system application scans nearby pixels having disparity values associated with them and samples the values of those nearby pixels. In an example embodiment, the scanning and sampling may be radially conducted for pixel disparity values around the identified pixel hole. In another example embodiment, the multi-view stereo imaging system application executes instructions to begin with holes in or near regions where pixels in the pixel map are mostly filled with disparity values. In a further embodiment, the multi-view stereo imaging system application may execute instructions to scan through the disparity values of the entire image disparity map. Scanning and sampling may occur left-to-right and then right-to-left or vice-versa across the disparity map of the plural image. Then the assessment of values in radial locations near the hole may be determined at progressively greater distances from the disparity map hole.

An averaging or weighted averaging of disparity values for pixels within a pre-determined radial distance from the identified pixel hole may be used to fill the hole by assigning a pixel disparity value to the hole. The multi-view plural imaging application may take an average of radially sampled disparity values for pixels close to the hole in the disparity map and assign the averaged disparity map value to the pixel hole in some embodiments. Weighting factors may also be applied to the averaging of scanned pixel disparity values in some embodiments. For example, scanned pixel disparity values radially closer to the location of the hole may be weighted more in the averaging than to those further away to maximize the effect of those values on the disparity value yielding to fill the hole in some embodiments. Additionally, multi-view stereo imaging system application will set a limit of radial distance from the pixel hole location in which pixel disparity values will be included in the averaging to yield a hole-filling value. The pixel disparity value used to fill the hole is then saved along with the disparity map and the system recursively works to fill the next identified hole. In this way, the multi-view stereo imaging system may computationally shrink the disparity map holes. In some embodiments, a group of pixel holes within a radial distance of a filled hole may be filled with the same determined pixel value to reduce consumption of computing resources or for convenience as described above. Additionally, scan conversion may be applied to define disparity map holes with polygons and apply scan conversion to fill in disparity map values for the pixel holes intersecting with the polygons.

Flow proceeds to block 625 where the multi-view stereo imaging system applies smoothing to the histogram of disparity values. In an example embodiment, a spline calculation of histogram values may be made and curve fitting done to smooth the curve of the histogram. In other embodiments, bilateral filtering may be conducted on the disparity value histogram to smooth transitions within the disparity value histogram without reduction of edges as described above. The resulting smoothed histogram of disparity values results in reduced noise.

At block 630, the processing conducted by the multi-view stereo imaging system application remaps some of the disparity values to create intelligent depth-based image segments. The multi-view stereo imaging system assesses the histogram values along the x-axis, such as in the example of FIG. 5, to determine peak maxima in the smoothed histogram values. It is seen from FIG. 5 that smoothing of the histogram for noise may eliminate noise associated for example with the middle peak 530 and result in a single peak 530 that may represent one or more potential objects within an image at that depth corresponding to the disparity value level. Upon identification of the peak values 530, as distinguished from the valleys 540 in histogram values, such as in FIG. 5, the multi-view stereo imaging system application determines pixel disparity values in a close neighborhood of the peak value. In an example embodiment, the close neighborhood to the peak value may be defined in the multi-view stereo imaging system as having a threshold of +/−3 disparity values, such as the x-values of FIG. 5, on either side of the maximum peak value 530. It is understood that any close neighborhood threshold may be selected. Some example embodiment close neighborhood ranges of disparity values are shown at 570 in FIG. 5. In some embodiments, the close neighborhood may depend on the y-value (number of pixels at a disparity value) difference between a peak disparity value and the y-value of a neighboring disparity value histogram level. With a y-value difference that is greater between the peak maxima and a neighboring value, meaning the peak is sharper, the multi-view stereo imaging system application may assign a smaller close neighborhood threshold. If, on the other hand, the y-value difference is not as great between a peak and neighboring pixel disparity values, a wider close neighborhood threshold may be assigned by the multi-view stereo imaging system. With these heuristics, a close neighborhood of pixel values to the maximum peak values in a disparity value histogram may be identified.

At block 635, the multi-view stereo imaging system may shift all pixel-associated disparity values in the close neighborhood closer to the identified histogram peak maximum disparity value, for example, as shift of one or two disparity value closer to the peak maximum value may occur via execution of application instructions. In another embodiment, pixel disparity values may be reassigned as having a value equal to the peak disparity value maximum. These pixel values are reassigned in the pixel disparity map and stored as part of the composite plural image. This statistically correlates the concentrations of depth values (or inversely proportional disparity values) into a defined range associated with the entire object or objects within the image at a given depth level. Similarly, the valleys between the peaks are assigned thus a wider spectrum which statistically correlates the gaps between objects at different depths to a wider spectrum of depth values.

These reassigned pixel disparity values are saved with the disparity map associated with a composite plural image frame. The disparity map with reassigned peak disparity values will be encoded into a depth mask and provide better results for selection of objects at a given distance by providing an ability to select an entire object or the entirety of a plurality of objects at a given depth segmentation. This will be useful for application of image filtering or application image effects to entire objects at a selected image depth.

At block 640, the modified disparity map is encoded and converted into depth values to generate a depth mask associated with the composite plural image frame. In accordance with description above, range-inverse encoding may be applied to encode the depth mask using the modified disparity map in accordance with one or more embodiments of the present disclosure. With the range inverse encoding applied, the sharpened peaks and pixel depth value associated with the entire object or objects located at that distance will only occupy fewer or even a single bit of encoding due to the consolidation of the peaks as described. Valleys, as a result, will occupy a wider spectrum of encoded depth values thus enhancing the gaps between objects and making selection of objection easier and application of post-processing image filters or other image effects substantially improved. FIG. 4 shows an example embodiment of depth based segmentation of a composite plural image frame with depth-based image segmentation due to a depth mask. Several features or objects are shown with hatching, shading, or lack of either as appearing at various depths within the composite plural image frame depth mask, and may have image filtering or image effects applied. At this point, the method ends.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of depth-based computational photography comprising:
    recording a first image using a stereoscopic camera system;
    establishing a disparity map, via a processor executing codes instructions, of the first image including a determination of pixel distance between features in the first image and the features in a second image;
    identifying holes in disparity map of the first image and computationally shrinking at least one hole in the disparity map via applying a weighted average of radially sampled disparity map values proximate to the at least one hole, wherein sampled disparity map values for pixels closer to the at least one hole have greater weighting than sampled disparity map values for pixels further from the at least one hole;
    removing noise in the disparity map via edge smoothing;
    determining pixel depth values from the disparity map; and
    encoding the pixel depth values into a depth mask for a composite plural image.

2. The method of claim 1 further comprising:
    encoding depth values into a depth mask for the composite plural image such that more bits in the depth mask are assigned to foreground pixel depth values than to background pixel depth values.

3. The method of claim 1 further comprising:
    encoding depth values into a depth mask using range-inverse encoding.

4. The method of claim 1 comprising:
    applying a post-processing image filter to at least one image depth segmentation of the depth mask, wherein the depth mask correlates to a plurality of ranges of pixel depth values into image depth segmentations.

5. The method of claim 4 wherein applying the post-processing image filter includes an image filter selected from a group consisting of a black and white filter, a focus filter, an exposure level filter, and a color filter.

6. The method of claim 1 wherein encoding the disparity map into a depth mask includes image depth segmentation that statistically correlates a spectrum of pixel depth values to represent an object in the composite plural image.

7. The method of claim 1 comprising:
    generating a histogram of pixel disparity values from the disparity map;
    identifying a histogram peak disparity value maximum corresponding to an image object in the image;
    shifting pixel disparity values in a close neighborhood range of the histogram peak disparity value maximum to equal the histogram peak disparity value maximum to sharpen the histogram peak corresponding to the image object; and
    assigning the shifted pixel disparity values to pixels in the disparity map.

8. An information handling system comprising:
a stereoscopic camera system for recording a first image;
a processor operatively coupled to the stereoscopic camera system to establish a disparity map associated with the first image including a determination of pixel distance between features in the first image and the features in a second image;
the processor to execute instructions to identify holes in the disparity map associated with the first image and process the disparity map by computationally shrinking the holes using scan conversion applied to the disparity map with weighted, averaged disparity map values radially sampled from areas proximate to the hole, where disparity map values of pixels closer to the holes have a greater weighting value than disparity map values of pixels further from the holes in the weighted averaging;
the processor to encode the disparity map into a depth mask of a composite plural image; and
a memory operatively coupled to the processor, the memory for storing the composite plural image with the depth mask.

9. The information handling system of claim 8 further comprising:
the processor to construct the composite image including the depth mask having image depth segmentation with a plurality depth value ranges.

10. The information handling system of claim 8 further comprising:
the processor executing instructions to remove noise in the disparity map values via edge smoothing.

11. The information handling system of claim 8 further comprising:
the processor encoding depth values from a disparity map via range-inverse encoding such that more bits in the depth mask are assigned to a foreground pixel depth values than background pixel depth values.

12. The information handling system of claim 8 further comprising:
the processor applying a post-processing image filter to at least one image depth segmentation of the depth mask.

13. The information handling system of claim 12 wherein the post-processing image filter includes a focus filter applied to the at least one image depth segmentation.

14. The information handling system of claim 8 further comprising:
the processor determining a histogram of disparity values from the disparity map;
the processor to identify peak disparity map values and to shift disparity values within a limited range of a peak disparity value histogram maximum closer to the peak disparity value histogram maximum to sharpen image depth segmentation in a depth mask associated with one or more image objects.

15. A method of depth-based computational photography comprising:
recording a first image using a stereoscopic camera system;
establishing a disparity map, via a processor executing code instructions, of the first image including a determination of pixel distance between features in the first image and the features in a second image;
determining a histogram of pixel disparity values from the disparity map; removing statistical outlier pixel disparity values;
identifying holes in disparity map of the first image and computationally shrinking holes in the disparity map via averaging disparity map values proximate to the hole;
determining whether any scanned disparity map values are different in value to those proximate to the hole;
rejecting scanned pixel disparity map values with different value to those proximate to the hole and determining a weighted average based on radially sampled areas of remaining scanned disparity map values proximate to the hole; and
sharpening histogram pixel disparity value peaks by shifting pixel disparity values in a close neighborhood range of a histogram pixel disparity value peak maximum closer to a pixel disparity value at the histogram pixel disparity value peak maximum for a composite plural image of the first and second images.

16. The method of claim 15 further comprising:
applying bilateral filtering to the disparity map values reduce pixel disparity value noise in the histogram.

17. The method of claim 15 further comprising:
determining depth values from the disparity map to construct the composite plural image with a depth mask.

18. The method of claim 17 further comprising:
encoding the depth values in the composite plural image using range-inverse encoding.

19. The method of claim 15 wherein, sharpening histogram pixel disparity value peaks includes shifting pixel disparity values in the close neighborhood range of the histogram pixel disparity value peak maximum to equal the pixel disparity value at the histogram pixel disparity value peak maximum.

20. The method of claim 17 comprising:
applying a post-processing filter to at least one image depth segmentation of the depth mask.

* * * * *